May 17, 1966  T. W. JOHNSON  3,251,391
INTERNAL BUFFER WITH SAFETY TIRE
Filed Jan. 11, 1965
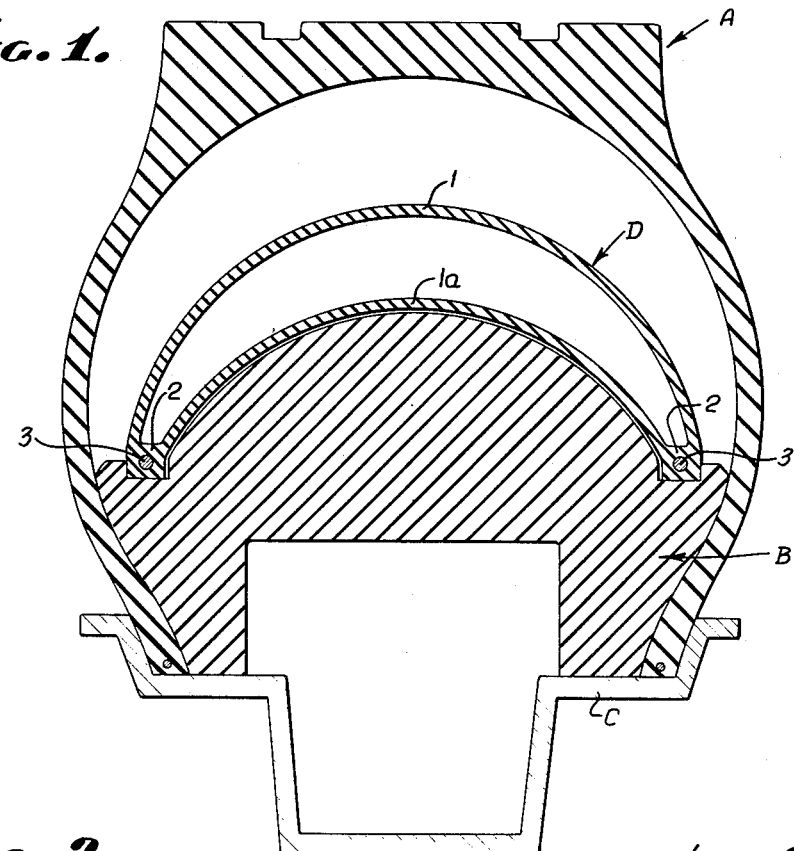
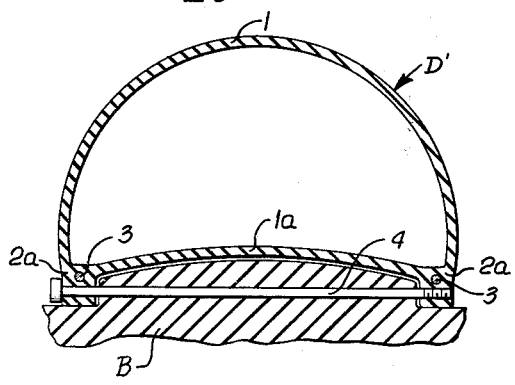
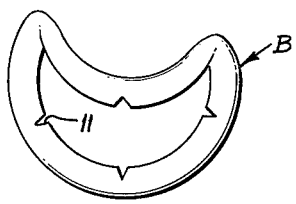
INVENTOR.
Tilden W. Johnson 
United States Patent Office 3,251,391  
Patented May 17, 1966

3,251,391  
INTERNAL BUFFER WITH SAFETY TIRE  
Tilden William Johnson, 5630 Sawtelle Blvd., Culver City, Calif.  
Filed Jan. 11, 1965, Ser. No. 424,782  
7 Claims. (Cl. 152—158)

This invention relates to a tubeless tire or tire for installation around the tread cap of a rim extending tire buffer to increase the factor of safety of tubeless tire buffers by providing a secondary pneumatic tire in case the covering tubeless tire loses its air.

The present invention is a continuation-in-part for a component in my copending application Serial No. 175,926 for a Safety Wheel and Components Therefor, now Patent No. 3,172,447, and sets forth matter disclosed in said copending application and further improvements in the said tire component of the safety wheel.

Heretofore it has been impractical to install currently manufactured tires or tubeless tires over tire buffers to increase the effectiveness of the tire buffer. It is the object of this invention to invent a novel construction for a tire for use over tire buffers to increase the overall factor of safety of pneumatic wheel assemblies capped by tubeless tires.

Other objects and advantages of this invention will further become apparent hereinafter and in the drawing in which:

FIGURE 1 shows a cross section view of a safety wheel assembly with enclosing tubeless tire "A," buffer "B," and rim "C" no part of this application but shown to demonstrate the location, fit and cross section structure of "D" the essence of this invention.

FIGURE 2 shows a cross section view of an alternate method of installing on a differently constructed buffer.

FIGURE 3 shows a cross section view with a fragmentary buffer of another method of constructing the tire of this invention with use of a tube.

FIGURE 4 shows an elevation view of the buffer as it is folded into a crescent shape for installing inside the beads of the tire of this invention and indicates how after the tire is installed over the buffer the tire and buffer is installed as a unit.

Referring to the drawing by letters and numbers:

The letter "A" represents the usual tire or tubeless tire enclosing unit and is for illustration only and is no part of this invention.

The letter "B" represents a high, wide, strong buffer or rim extension and is shown to illustrate the use of the buffer tire and "B" is no part of this invention as applied for in this application.

The letter "C" represents a rim and is no part of this continuation-in-part application and is shown for illustration only.

The letter "D" represents the tire of this invention.

The numeral 1 represents typical air retaining carcass reinforced tubeless tire carcass and is no part of this invention except as combined in the special structure of the tire "D."

Numeral 1a represents typical air retaining, carcass reinforced tubeless tire carcass as used for inner air shields in tires and is no part of this invention except as combined with the bead and tire structure to form the buffer contacting part of the tire "D."

Numeral 2 represents the special bead structure of this invention.

Numeral 2a represents the bead of 2 with one or more holes in inner annulus of the bead whereby bolts or screws or like means may be used for attachment to the buffers.

Numeral 3 represents substantially inextensible tire bead wirelike cores.

Numeral 4 represents one type of bolt, or preferably a countersunk Allen screw bolt used for installing on some buffers.

Numeral 5 represents another type of bolt attachment to the buffer, preferably of the countersunk Allen head screw type.

Numeral 6 represents a special type tire carried retaining slot and flange to receive special tire bead 7. This type of tire casing requires the use of a tube with the tire.

Numeral 7 represents a special type tire bead for fitting in special tire carrying bead slot and tire retaining flange.

Numeral 8 represents an Allen head type of screw that can be used in some cases to assure the operation of special tire D" on some types of buffers where it will or may be needed.

Numeral 9 represents a tire tube and is no part of this invention except for special shape to conform to special shape tire "(D")."

Numeral 10 represents a tube air valve through the sidewall of tire "(D")" and is no part of this invention. Needless to say this valve may take any desired shape and be located any convenient spot in the assembly.

Numeral 11 represents slots across the buffer beads and sidewall annulus at one or more places and is no part of this tire continuation-in-part application. It is shown to indicate how the buffer can be fitted inside the tire "D" when the tire beads are unbroken and substantially inextensible. It should be noted here that once buffer "B" is installed over the unyielding rim bead seat of "C" the buffer takes a firm shape eliminating in use the flexibility available for installing and removing said assembly.

From the foregoing it is apparent I have invented an installable and useful tire for use with tire buffers that increases the factor of safety of buffers when used in pneumatic wheel assemblies and thus also increasing the factor of safety of pneumatic wheel assemblies capped by tubeless tires.

Several embodiments have been described varying as to buffer type and inflation pressure and tonnage of vehicle used. The preferred embodiment therefore is that most adapted to the class of use. For some vehicles it will be preferable to use the single unit air retaining carcass as in "D" and "(D')" and repairing any air leaks from outside or by incising under carcass 1a for repair and then sealing from the outside the incision in carcass 1a. In other cases it will be preferable to use type "(D")" in FIGURE 3 with a tube inside it. Of course in case this type tire is used without a covering tire over it so that it directly contacts the road it will be necessary to give it exterior tire carcass and form including a regular tire tread all of which would be no part of this invention except as combined with the features of this invention.

Having now described and illustrated one form of my invention and species thereof, I wish it to be understood that my invention is not to be limited to the specific form or arrangement of parts herein described and shown, or specifically covered by my claims.

The detailed description of the particular embodiments of the invention illustrated and described herein is not to be construed as limiting the invention thereto. The invention includes all features of patentable novelty residing in the foregoing description and the accompanying drawing.

I claim:

1. In a wheel consisting of a pneumatic safety tire mounted on and secured to a flexible buffer, said buffer and said safety tire enclosable by another pneumatic tire mounted on a rim a safety tire having a circumferential lateral cap, each lateral edge of said cap extending in a sidewall radially towards the wheel axle center, one or more of said sidewalls terminating in beads wider than said sidewall, said bead having substantially inextensible bead reinforcement, said safety tire characterized by having in combination said bead located circumferentially at a point in one or more of said sidewalls radially between the greatest circumference of the cap of said buffer on which said safety tire is mounted and the greatest lateral diameter of said buffer.

2. A tire carcass as in 1 further characterized by said bead having suitably reinforced material surrounding lateral holes therein whereby screws and bolts can be used to attach to buffers as occasion may require.

3. A tire carcass as in 2 further characterized by having usual tire sidewall rubber and tread added thereto whereby said carcass can be used without a covering tire.

4. A tire carcass as in 1 further characterized by one bead being extended at a point above the least circumference of said bead by like carcass material laterally with various buffer contacting shapes and said carcass extension terminating in a hooked shape tire bead retaining flange and bead slot for engagement with the other bead of said tire carcass.

5. A tire carcass as in 4 further characterized by suitable reinforcing material surrounding one or more holes in said bead retaining flange and slot and in said engaging carcass bead for suitable stable adherence of said carcass bead to said carcass retaining hooked shape slot with tire bead retaining flange.

6. A tire carcass as in 5 further characterized by an outlet for the valve stem of an enclosed tube therein.

7. A tire carcass as in 6 further characterized by a tire tread and sidewall rubber being added thereto whereby said tire can be used for direct road engagement without being enclosed in another tire.

References Cited by the Examiner
UNITED STATES PATENTS

| | | | |
|---|---|---|---|
| 612,229 | 10/1898 | Barlow | 152—375 |
| 957,413 | 5/1910 | Constantin | 152—379 X |
| 1,623,162 | 4/1927 | Burritt | 152—375 |
| 2,040,759 | 5/1936 | Nore | 152—158 |
| 2,786,507 | 3/1957 | Howe et al. | 152—361 X |

ARTHUR L. LA POINT, *Primary Examiner.*

C. W. HAEFELE, *Assistant Examiner.*